United States Patent [19]

Renault et al.

[11] 3,883,638
[45] May 13, 1975

[54] PROCESS FOR REMOVING SULFUR DIOXIDE AND SULFUR TRIOXIDE FROM WASTE GAS AND PRODUCING SULFUR THEREFROM

[75] Inventors: Philippe Renault, Noisy-le-Roi; Claude Dezael, Maisons-Laffitte; Andre Deschamps, Chatou; Sigismond Franckowiak, Montesson, all of France

[73] Assignee: Institut Francais du Petrole, des Carburants et Lubrifiants, Rueil Malmaison, France

[22] Filed: Mar. 15, 1973

[21] Appl. No.: 341,468

[30] Foreign Application Priority Data
Mar. 15, 1972 France .......................... 72.09117

[52] U.S. Cl. ................ 423/242; 423/541; 423/574
[51] Int. Cl. ........................................ C01b 17/04
[58] Field of Search .......... 423/242, 356, 541, 575, 423/520, 358, 541 A

[56] References Cited
UNITED STATES PATENTS

| | | | |
|---|---|---|---|
| 2,676,090 | 4/1954 | Johnstone | 423/242 |
| 3,282,646 | 11/1966 | Bonfield et al. | 423/541 |
| 3,321,275 | 5/1972 | Furkert et al. | 423/356 |
| 3,441,379 | 4/1969 | Renault | 423/575 |
| 3,645,671 | 2/1972 | Griffin et al. | 423/242 |
| 3,676,059 | 7/1972 | Welty | 423/242 |
| 3,695,829 | 10/1972 | Griffin et al. | 423/242 |

*Primary Examiner*—O. R. Vertiz
*Assistant Examiner*—Brian E. Hearn
*Attorney, Agent, or Firm*—Millen, Raptes & White

[57] ABSTRACT

A waste gas containing $SO_2$ and $SO_3$ is washed with water and ammonia; the resulting solution of ammonium sulfites and sulfates is heated for converting the sulfites to $SO_2$ and $NH_3$, the sulfates are reacted with a reducing agent for producing additional $SO_2$ and all the $SO_2$ is reacted with $H_2S$ so as to obtain sulfur. A flow of inert gas is passed through the intermediately formed solution of neutral ammonium sulfate for converting it to ammonium hydrogen sulfate.

5 Claims, 1 Drawing Figure

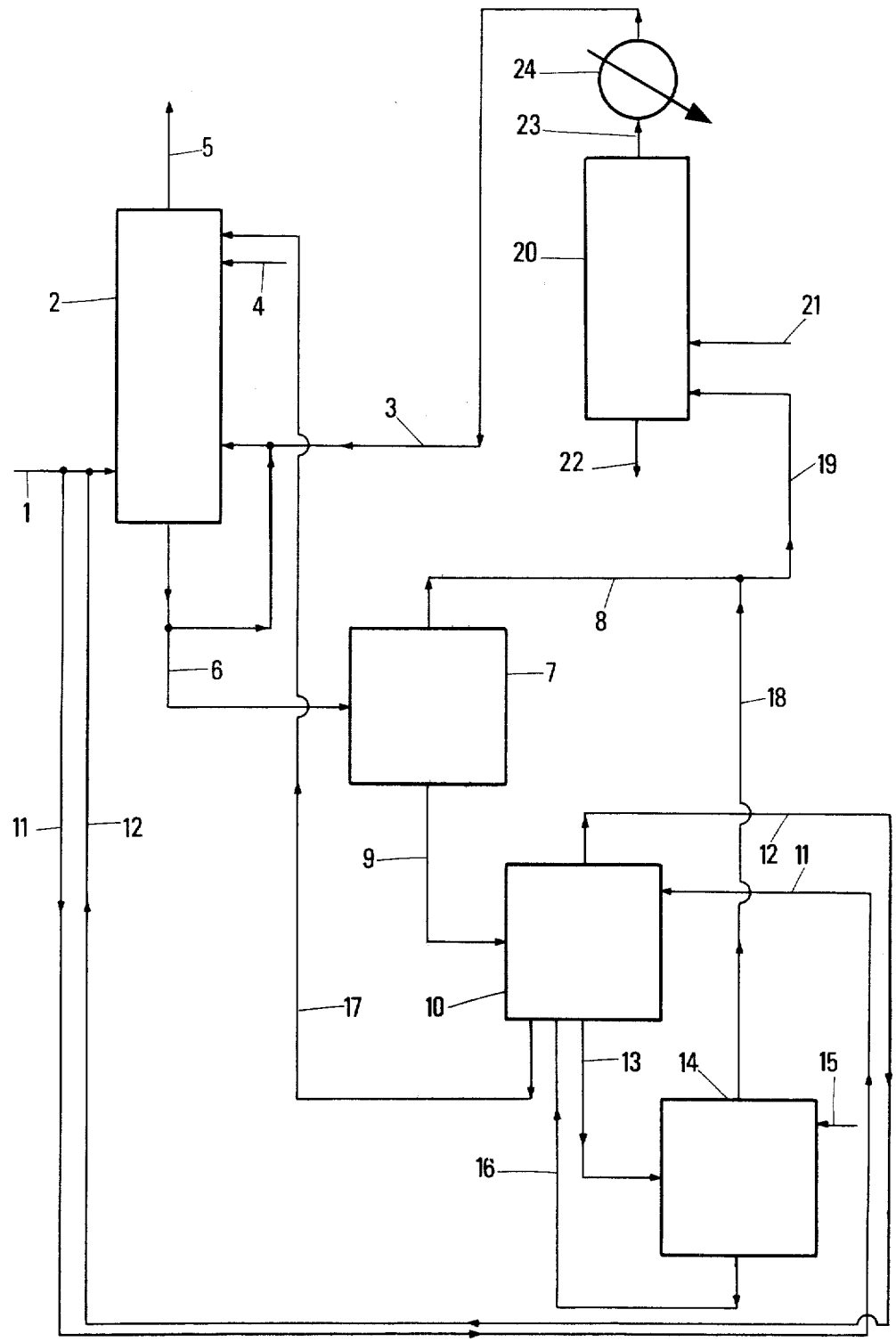

PROCESS FOR REMOVING SULFUR DIOXIDE AND SULFUR TRIOXIDE FROM WASTE GAS AND PRODUCING SULFUR THEREFROM

This invention concerns the removal of sulfur dioxide and sulfur trioxide from waste gas with the production of elemental sulfur.

The combustion fumes, particularly those from power plants fed with fuel-oil or other sulfur containing fuels or from incinerators in which sulfur containing compounds are burnt, contain $SO_2$ and, in a lower proportion, $SO_3$ which are highly polluting agents. Some chemical plants, for example those which produce sulfuric acid, also produce $SO_2$ containing fumes.

The removal of these compounds by means of ammonia provides for a good purification of the fumes and supplies brines containing ammonium sulfite and ammonium hydrogen sulfite, and also ammonium sulfate corresponding to the sulfuric anhydride pre-existing in the fumes or to the conversion of the sulfites. They can also contain by-products, for example ammonium thiosulfate.

The ammonia may be supplied from the plants in which acid gases, as contained for example in the waste gas from Claus furnaces, are converted to sulfur when contacted with an ammonia containing solvent as catalyst.

The treatment of these brines for recovering ammonia and producing sulfur therefrom has been previously proposed.

According to the U.S. Pat. No. 3,561,925 of the 9th of Feb. 1971, ammonium sulfite and ammonium hydrogen sulfite in aqueous solution are reduced to sulfur by means of hydrogen sulfide in a solvent. The selectivity is not always good due to the presence of by-products, particularly sulfates and thiosulfates, said by-products also contaminating the produced sulfur.

According to the French Patent No. 2,128,955 (U.S. Pat. Application No. 228,830), this drawback is avoided by vaporizing brine at a temperature of from 100° to 200°C, so as to convert ammonium sulfite and bisulfite to a gaseous mixture of sulfur dioxide, ammonia and water. When contacted with hydrogen sulfide, in the presence of a solvent, sulfur dioxide is converted to sulfur. THe sulfates and thiosulfates do not vaporize and form a residue which is removed.

A process has now been found, and this is the main object of the invention, which provides for the direct production of practically pure sulfur and the highly selective conversion of all the sulfur-containing compounds present in the brines.

This process comprises contacting a waste gas containing sulfur dioxide, sulfur trioxide and/or hydrogen sulfide with ammonia in the presence of water, then heating the resulting aqueous solution, which contains ammonium salts, particularly ammonium sulfites, sulfate and optionally thiosulfate, so as to release gaseous sulfur dioxide, ammonia and water and to obtain a liquid outflow, then heating this outflow up to a sufficient temperature for melting the salts contained therein, treating it with a gas flow so as to transform the neutral ammonium sulfate to the corresponding hydrogen sulfate, then contacting the latter with a reducing agent so as to obtain a gaseous evolution of sulfur dioxide and water, thereafter transforming the sulfur dioxide to sulfur in known manner and making use of the recovered ammonia for manufacturing the scrubbing ammonia solution.

In a first stage, the waste gas containing $SO_2$ and $SO_3$ and/or $H_2S$, if any, is contacted with ammonia, in the presence of water, at a temperature of from 30° to 80°C, preferably from 35° to 50°C. The contact time is so selected as to permit an absorption of at least 50% of the $SO_2$ of the gas. The waste gas may thus be easily made free of practically all $SO_3$, when present, and at least 90% of $SO_2$ in reasonable contact times.

The resulting solution essentially contains ammonium neutral sulfite, ammonium hydrogen sulfite and ammonium neutral sulfate which cannot be avoided, and sometimes also by-products such as, for example, ammonium thiosulfates. If desired, this solution may be concentrated by using, for example, hot fumes as heating fluid.

In a second stage, the solution resulting from the first stage is further heated so as to vaporize at least partly the sulfitic components. The vaporization is usually carried out at a temperature above 100°C, preferably 120°-160°C, so as to eliminate at least 50% and preferably from 80 to 95% of the sulfites.

The products of this stage are a vapor phase, which comprises essentially sulfur dioxide, ammonia and water, and an aqueous liquid outflow containing the unchanged ammonium neutral and hydrogen sulfites, the sulfate and sometimes the ammonium thiosulfate.

During the third stage, this liquid outflow is further heated, for example, up to 160°-300°C and preferably 180°-250°C, and is contacted with a gas stream which may consist of an available inert gas, for example a stream of nitrogen or carbon dioxide or of the fumes to be treated. Water, when present, vaporizes and, in these conditions, the mixture of melted salts grows impoverished in ammonium neutral sulfate and enriched in the corresponding hydrogen sulfate. The remaining sulfites and the thiosulfates obviously decompose.

The gas outflow from the third stage reactor essentially contains ammonia resulting from the dissociation of the ammonium neutral sulfate to ammonium hydrogen sulfate and from the cracking of the sulfites and the thiosulfates, a small amount of $SO_2$, vaporized sufur as traces and sometimes steam. This outflow may be advantageously supplied to the inlet of the first stage of the process, during which ammonia is recovered by scrubbing.

The liquid product recovered from the third step reactor is contacted, in a fourth stage, with at least one reducing agent, for example hydrogen sulfide, sulfur, carbon, hydrogen, formic acid or hydrocarbons in the form of fuel-oil or gas-oil. The temperature in this step depends on the reducing agent and may range from 150° to 350°C or more; it is usually about 250°C. The reducing compounds may be used separately or as mixtures.

In this stage, at least a fraction of the ammonium hydrogen sulfate is reduced to $SO_2$ and $H_2O$ which escape from the reactor, although the produced ammonia may neutralize a fraction of this hydrogen sulfate to ammonium neutral sulfate which is then fed back to the third stage reactor.

When desired, a fraction of the liquid outflow from the third stage may be used for scrubbing the traces of ammonia which escape from the first stage of the process by directing a part of this outflow to the top of the scrubbing zone for use therein with the ammonia solution.

The main reactions which take place in the second, third and fourth stages, as above defined, are the following:

$(NH_4)_2SO_3 \rightarrow SO_2 + 2NH_3 + H_2O$
$3(NH_4)_2S_2O_3 \rightarrow 3S + 3SO_2 + 6NH_3 + 3H_2O$
$(NH_4)_2SO_4 \rightarrow NH_4HSO_4 + NH_3$
$2NH_4HSO_4 + S \rightarrow 3SO_2 + 2NH_3 + 2H_2O$
$3NH_4HSO_4 + H_2S \rightarrow 4SO_2 + 3NH_3 + 4H_2O$
$NH_4HSO_4 + 3H\text{-}COOH \rightarrow S + NH_3 + 3CO_2 + 4H_2O$ The resulting gas outflows, which essentially contain $SO_2$, $NH_3$, $H_2O$, vaporized sulfur and $H_2S$ in low amounts and sometimes hydrocarbon traces or $CO_2$, are supplied to a fifth stage for converting the acid gases to sulfur according to the reaction:

$2H_2S + SO_2 \rightarrow 3S + 2H_2O$

Additional $H_2S$ may be supplied to the reactor of this stage, so as to obtain a quantitative reaction with $SO_2$. The temperature is usually 20°–180°C, preferably 120°–170°C, for example 140°C, in the presence of a liquid phase. Sulfur is produced and recovered. The gaseous outflow containing ammonia, water and acid gases in low proportion is used after cooling for reconstituting the scrubbing solution of the first stage of the process.

The liquid phase which is present in the fifth stage reactor consists of a liquid which is inert with respect to $SO_2$ and $H_2S$, for example melted sulfur, an alcohol, a glycol, glycerol, another polyol, a polyglycol, an ether, a carboxylic ester, a phosphoric ester or a glycol, glycerol, polyol or polyglycol ester or ether, or tetramethylene sulfone. Such solvents are described, for example, in the U.S. Pat. Nos. 3,441,379 and 3,598,529. Catalysts, for example those mentioned in said patents, may also be used. A preferred embodiment for carrying out the process is illustrated in FIG. 1 of the accompanying drawing.

The waste gas to be purified is supplied through pipe 1 to the scrubbing zone 2 for $SO_2$ and $SO_3$, where it is directly contacted with an ammonia solution introduced through line 3. Water is supplied through line 4 in order to control the temperature at the top of the zone 2. The purified waste gas is discharged through line 5 and there is obtained from the bottom of the scrubber 2, through line 6, a brine mainly containing neutral ammonium sulfite, neutral ammonium sulfate and ammonium thiosulfate. It may also contain a small amount of ammonium hydrogen sulfite. At least one part of this brine is introduced into a vaporizer 7. The gas evolved through line 8 consists essentially of $SO_2$, $NH_3$ and $H_2O$. The unvaporized liquid flows down and is conveyed through line 9 to a reactor 10 in which the residual sulfites and the ammonium thiosulfates decompose and the neutral sulfate is converted to the hydrogen sulfate, while scavenging with a portion of the fume from line 11. This fume is withdrawn at the inlet of the zone 2 and is reinjected therein through line 12.

A liquid phase is collected from the bottom of the reactor 10, is passed through line 13 and introduced into the reactor 14. A $H_2S$ stream is supplied through line 15 to this reactor, said $H_2S$ being used for reducing the ammonium hydrogen sulfate to $SO_2$, $NH_3$ and $H_2O$. At least a portion of the released ammonia reacts with the hydrogen sulfate and gives neutral sulfate again, which is reintroduced into the reactor 10 through line 16. The gaseous outflows discharged from the reactor 7 through line 8 and from the reactor 14 through line 18 are introduced through line 19 into a reactor 20. The latter, maintained at 140°C, contains a solvent, for example polyethylene glycol, and receives additional $H_2S$ from line 21. Sulfur is thus formed and withdrawn through line 22. The gaseous outflow, which contains a low proportion of unconverted acid gases, water and ammonia, is withdrawn from the reactor 20 through line 23, is passed through a cooler 24 and forms at least a portion of the ammonia solution introduced from line 3 into the zone 2. Through line 17 a portion of the outflow from the unit 10 is supplied to unit 2.

The following examples illustrate the invention:

EXAMPLE 1

100,000 N m³/hour of a waste gas containing 2,000 ppm of $SO_2$ and 150 ppm of $SO_3$ by volume are introduced into a tower (2), maintained at 50°C, in which they are treated with an aqueous ammonia solution. The waste gas withdrawn from this tower contains only 150 ppm of $SO_2$.

The hourly outflow withdrawn from the bottom of the tower, contains:

2.25 kmoles of $(NH_4)_2SO_3$
5.25 kmoles of $NH_4HSO_3$
0.6 kmole of ammonium sulfate
45 kmoles of water It is supplied to a vaporizer (7) in which the temperature is maintained close to 150°C. The sulfites vaporize and there is obtained an hourly outflow containing 0.45 kmole of $(NH_4)_2SO_3$
1.05 kmoles of $NH_4HSO_3$
0.60 kmole of $(NH_4)_2SO_4$
7.5 kmoles of water.

It is introduced into a reactor (10) which is maintained at a temperature of 250°C and is fed with a flow of 1,000 m³ per hour of the waste gas to be treated. This gas, which is re-injected at the inlet of the scrubbing zone, carries along 4% of $NH_3$, 3% of $SO_2$ and 15% of water by volume.

The melted salts, of increased ammonium hydrogen sulfate content, are collected at the bottom of the reactor (10) and treated at 250°C in another reactor (14) by $H_2S$ at a rate of 0.4 kmole of $H_2S$ per hour.

The gas outflows obtained after decomposition of the sulfites and reduction of the hydrogen sulfate by means of $H_2S$ are collected and supplied to a reactor (20) containing polyethylene glycol and maintained at 130°C.

There are thus supplied to this reactor, in 1 hour: 8.3 kmoles of $SO_2$, 10.35 kmole of $NH_3$ and 46 kmoles of water, and also a feed gas containing 16.4 kmoles of $H_2S$ through pipe (21).

Sulfur is formed and collected; ammonia is withdrawn and fed back to the waste gas scrubbing zone.

EXAMPLE 2

Example 1 is repeated, except that the waste gas contains 2,000 ppm of $SO_2$, 150 ppm of $SO_3$ and 80 ppm of $H_2S$ by volume. It is treated at a feed rate of 100,000 Nm³ per hour.

After treatment with ammonia, the hourly liquid outflow contains as ammonium salts:

1.97 kmole of $(NH_4)_2SO_3$
4.59 kmoles of $NH_4HSO_3$
0.60 kmole of $(NH_4)_2SO_4$
0.48 kmole of $(NH_4)_2S_2O_3$ and 45 kmoles of water.

The sulfites are then vaporized and there is obtained a hourly outflow rate of:

0.39 kmole of $(NH_4)_2SO_3$
1.30 kmole of $NH_4H\,SO_3$
0.6 kmole of $(NH_4)_2SO_4$
0.48 kmole of $(NH_4)_2S_2O_3$
3 kmoles of water.

This outflow is heated up to 250°C and 2,000 Nm³ per hour of the waste gas to be treated are passed therethrough. The waste gas is thereafter re-injected at the inlet of the scrubbing zone; it contains 2.6% of $SO_2$, 4.4% of $NH_3$ and 4.5% of water.

The melted salts are collected and treated in the next reactor with a gas stream providing a $H_2S$ feed of 0.4 Kmole per hour. A feed of 9.8 kmoles of $SO_2$, 0.2 kmole of $H_2S$, ammonia and water is thus introduced into the reactor for converting $SO_2$ to sulfur; a gas stream providing 19.4 kmoles of $H_2S$ is also supplied thereto.

Sulfur is formed and withdrawn; ammonia evolves and is fed back to the waste gas scrubbing zone.

What we claim is:

1. In a process for purifying a waste gas containing sulfur dioxide and sulfur trioxide, wherein the waste gas is contacted with ammonia and water, so as to obtain an aqueous solution of ammonium salts, containing ammonium sulfites and sulfates, this solution is heated up to a sufficient temperature for converting the ammonium sulfites to sulfur dioxide and ammonia, at least a portion of said sulfur dioxide is reacted with hydrogen sulfide, so as to obtain sulfur, and the ammonia is recycled to the waste gas contacting zone, the improvement comprising the additional step of further heating the solution to 160°–300°C., the sulfites of which have been converted, so as to melt the ammonium sulfates, treating it with at least a portion of the waste gas before contact of said portion with ammonia and water, said portion being thereafter contacted with said ammonia and water, so as to transform the ammonium neutral sulfate to the corresponding ammonium hydrogen sulfate, reacting the latter with a reducing agent at 150°–350°C., so as to convert it to sulfur dioxide and ammonia and treating said sulfur dioxide and ammonia as above indicated.

2. A process according to claim 1, wherein the aqueous solution containing the ammonium salts is heated up to a a first temperature in the range of from 120° to 160°C.

3. A process according to claim 1, wherein the aqueous solution containing the ammonium salts, after removal of the major part of the sulfites therefrom, is heated up to a second temperature in the range of from 180° to 250°C.

4. A process according to claim 1, wherein the reducing agent reacted with the ammonium hydrogen sulfate is hydrogen sulfide, sulfur, carbon, formic acid, a hydrocarbon or hydrogen.

5. A process according to claim 1, wherein the ammonium neutral sulfate, obtained as a by-product of the reaction of the ammonium hydrogen sulfate with the reducing agent, is treated again with a gas flow so as to form ammonium hydrogen sulfate again.

* * * * *